United States Patent
Hemmervall et al.

(10) Patent No.: US 10,797,372 B2
(45) Date of Patent: Oct. 6, 2020

(54) CHAIN CLAMP

(71) Applicant: Cue Dee AB, Robertsfors (SE)

(72) Inventors: Jan-Olof Hemmervall, Robertsfors (SE); Patrik Pettersson, Bureå (SE)

(73) Assignee: CUE DEE AB, Robertsfors (SE)

( * ) Notice: Subject to any disclaimer, the term of this patent is extended or adjusted under 35 U.S.C. 154(b) by 0 days.

(21) Appl. No.: 16/335,731

(22) PCT Filed: Sep. 22, 2017

(86) PCT No.: PCT/EP2017/074088
§ 371 (c)(1),
(2) Date: Mar. 22, 2019

(87) PCT Pub. No.: WO2018/055104
PCT Pub. Date: Mar. 29, 2018

(65) Prior Publication Data
US 2019/0237846 A1    Aug. 1, 2019

(30) Foreign Application Priority Data

Sep. 22, 2016  (SE) ...................................... 1651256

(51) Int. Cl.
*F16M 13/02* (2006.01)
*H01Q 1/12* (2006.01)
(Continued)

(52) U.S. Cl.
CPC ........... *H01Q 1/1228* (2013.01); *B29C 48/11* (2019.02); *B29C 48/12* (2019.02); *F16G 3/006* (2013.01);
(Continued)

(58) Field of Classification Search
USPC .................................................... 248/218.4
See application file for complete search history.

(56) References Cited

U.S. PATENT DOCUMENTS 2,882,071 A * 4/1959 Klompar ................ B64D 37/12
285/409
2,895,748 A * 7/1959 Oldham .................. F16L 23/10
285/410
(Continued)

FOREIGN PATENT DOCUMENTS

AU    2014 201 594 A1   10/2014
DE         2404890 A1   10/1974
(Continued)

OTHER PUBLICATIONS

CommScope Inc., "Andrew Steel Products", Product Selection Guide, 4th edition, 2010; pp. 36, 40-44.
(Continued)

*Primary Examiner* — Monica E Millner
(74) *Attorney, Agent, or Firm* — Cooper Legal Group, LLC; Ronald M. Kachmarik

(57) ABSTRACT

Chain clamp and method for clamping around an elongated object and for serving as a support for separate objects. The chain clamp includes a plurality of links with a first link and a second link, and with each link having two attachment portions, a connection member connecting links, and a tensioner adapted to connect to the first and second link and to force the links towards each other to tension the chain clamp and clamp it around the elongated object. At least one link is a piece cut from an elongated extrusion and has a fixed cross-sectional profile and a longitudinal direction, wherein each of the two attachment portions of the at least one link are defined by a respective portion of the cross sectional profile and its continuation along the longitudinal direction of the at least one link.

12 Claims, 4 Drawing Sheets

(51) Int. Cl.
  *H01Q 1/24*   (2006.01)
  *B29C 48/11*   (2019.01)
  *B29C 48/12*   (2019.01)
  *F16G 13/18*   (2006.01)
  *F16G 3/00*   (2006.01)
(52) U.S. Cl.
  CPC ............ *F16G 13/18* (2013.01); *F16M 13/02* (2013.01); *H01Q 1/246* (2013.01)

(56) References Cited

U.S. PATENT DOCUMENTS

| | | | | |
|---|---|---|---|---|
| 3,600,770 | A * | 8/1971 | Halling | B65D 45/32 24/279 |
| 3,661,409 | A * | 5/1972 | Brown | F16L 23/10 285/82 |
| 4,341,406 | A * | 7/1982 | Abbes | F16L 23/10 24/279 |
| 4,391,458 | A * | 7/1983 | Blakeley | F16L 41/12 285/112 |
| 4,455,720 | A * | 6/1984 | Sutton | F16B 2/08 24/205 |
| 4,488,744 | A * | 12/1984 | Bubeck | F16L 23/04 285/365 |
| 4,568,115 | A * | 2/1986 | Zimmerly | F16L 23/10 24/285 |
| 4,781,406 | A * | 11/1988 | Hubener | F16L 23/04 285/408 |
| 5,499,849 | A * | 3/1996 | Fend | F16L 23/08 285/367 |
| 5,645,303 | A * | 7/1997 | Warehime | F16L 23/10 24/279 |
| 5,692,544 | A * | 12/1997 | Friedrich | F16L 55/17 138/109 |
| 5,873,611 | A * | 2/1999 | Munley | F16L 23/10 24/20 W |
| 5,920,291 | A | 7/1999 | Bosley | |
| 5,984,612 | A | 11/1999 | Tatro | |
| 6,499,773 | B1 * | 12/2002 | Ostergaard | F16L 23/08 285/408 |
| 6,619,164 | B1 * | 9/2003 | Ricci | B23B 5/08 82/113 |
| 6,672,139 | B2 * | 1/2004 | Pampinella | G01M 3/04 138/89 |
| 7,828,340 | B2 * | 11/2010 | Heelan, Jr. | F16L 21/065 285/366 |
| 8,083,192 | B2 * | 12/2011 | Wells | G09F 15/00 248/218.4 |
| 8,191,840 | B2 * | 6/2012 | Jenestreet | F16B 12/42 24/20 R |
| 9,291,290 | B2 * | 3/2016 | Prischak | F16L 11/12 |
| 9,428,969 | B2 * | 8/2016 | Harbison | E21B 17/012 |
| 2005/0093763 | A1 | 5/2005 | Holle | |
| 2011/0083399 | A1 | 4/2011 | Lettkernan et al. | |
| 2016/0211569 | A1 | 7/2016 | Skrepcinski et al. | |
| 2016/0334057 | A1 * | 11/2016 | Koch | F16B 47/006 |

FOREIGN PATENT DOCUMENTS

| | | |
|---|---|---|
| DE | 10140506 A1 | 2/2003 |
| DE | 10 2006 005745 A1 | 8/2007 |
| DE | 10 2010 014907 A1 | 10/2011 |
| WO | 2013023755 A2 | 2/2013 |

OTHER PUBLICATIONS

Rosenberger Site Solutions, "Tower Components", Product Brochure, 2015; p. 20.
International Search Report to corresponding PCT application PCT/EP2017/074088, dated Jan. 25, 2018, 4 pages.
Swedish Search Report corresponding Swedish application 1651256-8, dated Apr. 20, 2017, 3 pages.

\* cited by examiner

CHAIN CLAMP

TECHNICAL FIELD

The invention concerns a chain clamp according to the preamble of claim 1. It also concerns a method for producing a chain clamp according to the preamble of claim 11 and a chain clamp as obtainable by such a method.

BACKGROUND ART

Introduction

The proliferation of mobile communications, and also point-to-point radio communications, has led to the use of tall support structures for the mounting of telecommunications equipment, such as radio antennas, in order to improve the reach of such equipment. The support structure may for instance be a pole, mast or a tower. The mounting of telecommunications equipment on to such support structures necessitates some kind of mounting device that can be attached to the support structure and which further provides a means for attaching the telecommunications equipment to the mounting device itself. The mounting device should preferably accommodate different diameters of the support structure, be easy to install, have low weight, be sturdy and should of course be able to support the weight of any telecommunications equipment mounted there to.

There are a number of different solutions for mounting telecommunications equipment that are used in the industry today. As an example, there are monopole ring mounts which comprise a number of metal members interconnected with relatively thin, threaded steel rods such as the ones described at http://www.commscope.com/catalog/wireless/product_details.aspx?id=1653. For instance, six metal members interconnected by two steel rods on either side to the next metal member. Together, the metal members and the steel rods constitute an assembly having a loop form that can be fitted around the support structure. Nuts on the thin threaded steel rods can be tightened to lessen the diameter of the assembly and in that way clamp it around and to the support structure. Each metal member comprises a metal plate with through holes to provide for mounting of the telecommunications equipment to the ring mount.

Another variant for mounting of telecommunications equipment to support structures includes chain mounts that comprise a chain comprising loops connected to each other in succession and having metal members that are floating on the chain. An example is shown at http://www.commscope.com/catalog/wireless/product_details.aspx?id=1510. In a mounted state of the chain mount, the metal members contact the surface of the support structure and the chain is tightened such that it presses against the metal members, clamping them to the support structure. The chain can be tightened by an arrangement with one end of the chain connected to a threaded bar and the other end connected to a metal tensioning member to which the bar also is connected. When a nut on the bar is turned, the bar moves in relation to the metal tensioning member and therefore also in relation to the chain, tightening the chain. The floating metal members have holes for the mounting of the telecommunications equipment.

A third variant is a link style band marketed by MacLean Power Systems and described at https://www.macleanpower.com/products/item.asp?ITEM_ID=2233. The band comprises galvanised steel links interconnected by rods that are secured by split pins/cotter pins. At each end of the band, there is a tensioner link. The tensioner links are connected with a threaded bar with nuts. The links can be brought together by tightening the nuts in order to clamp the band around a support. There are links with integral attachment points in the form of eyes where, for instance, guy-wires can be fastened. Adjustment to different diameters of a supporting pole can be accommodated with a special link that is divided into two pieces and with screws and nuts connecting the pieces. Adjustment can be accomplished by moving the nuts to different positions on the screws. There is also a mounting bracket link that provides a plate with rough holes for the mounting of various equipment.

Problems with Prior Art Solutions

A problem with the prior art designs is that some of them are quite convoluted which makes them expensive to produce and also awkward to mount. For instance, the metal members of the ring mount described above consists of two parallel metal plates interconnected by elongated angle irons that have to be assembled in a way that makes them stable. Presumably by welding or glueing.

Further, the ring mount has to be mounted to a supporting structure by turning a lot of nuts. Consider a three piece metal member ring mount. It comprises six rigid threaded bars with a nut in each end. Since the bars are rigid, all twelve of them must be tightened to a correct position in order for the three metal pieces to correctly engage and clamp the supporting structure. Also, due to the rigidity of the threaded bolts, it can be quite laborious to wrap the ring mount around a supporting structure; at least two threaded bolts have to to be disengaged from one of the metal plates and the remaining threaded bolts do not allow flexing to a high degree.

The link band is in a way an improvement over the ring mount. The link band requires only two nuts to be tightened during the fastening to a support structure, due to the chain structure of the link band wrapping around the support structure and the tensioner links at the end of the chain. However, the many links are quite heavy compared to the long, threaded bars of the ring mount. Also, the manufacturing of the links (by moulding) can be expensive. Further, since the circumference of the link band is adjusted by adding or subtracting links having a fixed width it may happen that for a certain circumference of a structure to be clamped, there is no suitable amount of links. That is, a certain number of links may be to few and one extra link to that number may be to many in the sense that the link band becomes to long for clamping the structure. For this reason, there is a special link with a threaded bar to adjust the width of the link. However, it can be costly to provide for an extra type of link in addition to the ordinary ones.

SUMMARY OF INVENTION

Technical Problem

It is an object of the present invention to propose a solution for or a reduction of the problems of the prior art. A main object is consequently to propose an improved mounting product, for the mounting of equipment to support structures (such as poles, masts and towers) which mounting product can be economical while yet delivering robust performance and at the same time is easy to set up.

Solution to Problem

According to the invention, this is accomplished with a chain clamp according to claim 1.

The chain clamp according to the invention solves the above problems by implementing a chain clamp with at least one link being cut from an elongated extrusion that has a fixed cross-sectional profile and a longitudinal direction, and each of the two attachment portions of the at least one link are defined by a respective portion of the cross sectional profile and its continuation along the longitudinal direction of the original extrusion. Normally all links in the chain, not one or a few, are from a cut extrusion.

Providing a chain clamp with links made from an extrusion promises to be a cheaper way of manufacturing the chain. The attachment portions are formed "for free" by virtue of being a part of the original extrusion in the longitudinal direction with a fixed cross-sectional profile coinciding with the cross-sectional profile of the original extrusion. Forming the links in this way by cutting is easier than having to assemble them by hand or develop a mould and then mould them. Also, the use of links made by pieces cut from an extrusion enables several further improvements to the chain clamp, since other parts of the links may also be provided as parts of the structure of the original extrusion without any further mounting, machining or mould necessary.

According to one aspect of the invention, the chain clamp has at least one link, cut from an extrusion with a fixed cross-sectional profile, with a hollow structure comprising an outer skin and an inner reinforcement structure. In this way, the weight of the links can be reduced while increasing the strength of the individual links and the chain as a whole. The hollow structure is very easy to accomplish by use of the extrusion with a corresponding hollow profile. Compared to the prior art link band, corresponding links can use less material while retaining their strength yielding a lighter and cheaper link. Compared to the metal members of the ring mount, the links of the present invention do not require any assembly or separate manufacturing step to achieve a strong structure. After simply cutting the extrusion, the links are ready to be put into use.

According to the invention, a solution is also provided by a method for producing a chain clamp and a chain clamp as obtainable by the method of the invention. The method and the chain clamp as obtainable by the method have advantages corresponding to the advantages of the chain clamp according to the invention.

The dependent claims disclose further advantageous aspects of the invention.

BRIEF DESCRIPTION OF DRAWINGS

Embodiments that exemplify the invention will now be described with reference to the attached drawings on which

DETAILED DESCRIPTION

Figure 1:
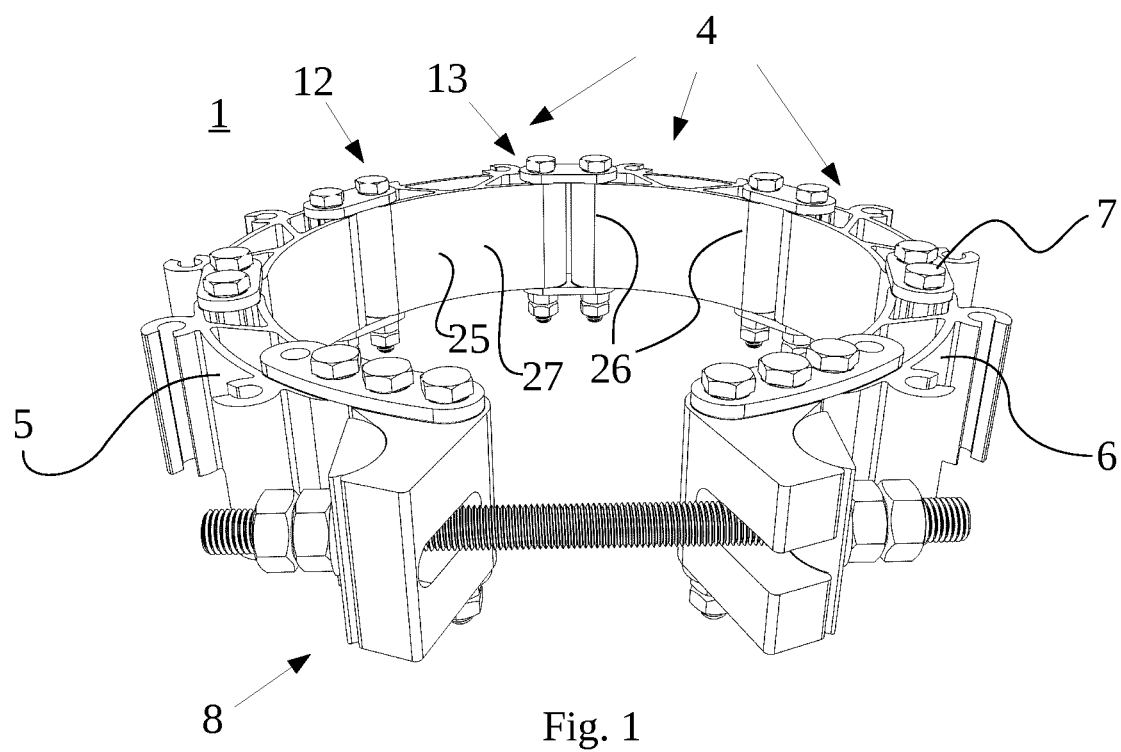
FIG. 1 illustrates a chain clamp according to the invention.

FIG. 1 depicts a chain clamp 1 according to the invention. The chain clamp 1 is devised for mounting equipment, e.g. telecommunications equipment, to elongated objects such as masts and poles in a quick manner and to avoid the drilling of holes in those elongated objects. This is accomplished by clamping the chain clamp around the elongated object and fastening the telecommunications equipment to the chain clamp.

The chain clamp 1 comprises a plurality of links 4 held together with connection member(s) 7 to form a chain. The plurality of links 4 comprises a minimum of two links. i.e., at least a first link 5 and a second link 6. Each link 4 has two attachment portions 11, one at one end 12 of the link 4 and another at an opposite end 13 of the link 4 (see FIG. 3). There is at least one connection member 7, connecting two different links 4 at their respective attachment portion 11 and keeping them together in the fashion of a chain such that they can rotate in relation to each other around the connection member. Depending upon the size of the links and the circumference of the object that should be clamped, the chain clamp can incorporate a suitable number of links 4, all connected together by the connection members 7. In FIG. 1, as an example, there are six links 4 held together by five connection members 7.

In order to tighten the chain clamp around an elongated object, a tensioner 8, adapted to connect to the first 5 and second link 6 is provided. When the links and the tensioner are all connected to each other, the tensioner can force the links 5, 6 towards each other to tension the chain clamp 1 and clamp it around the elongated object.

According to the invention, at least one link 4 is cut from an elongated extrusion having a fixed cross-sectional profile and a longitudinal direction. That is, such a link is a piece that has been cut from an elongated extrusion and the piece has fixed cross-sectional profile since the elongated extrusion from it was cut had such a cross sectional profile. Each of the two attachment portions 11 of the at least one link 4 are defined by a respective portion of the cross sectional profile and its continuation along the longitudinal direction of the original extrusion. That is to say that the attachment portions 11 of such a link 4 are defined by a respective portion of the cross sectional profile and its continuation along the longitudinal direction of the link 4. The longitudinal direction of the link is understood to be the direction perpendicular to the cross sectional profile and along which the cross sectional profile stays fixed. Thus, the attachment portions of the link are "automatically" formed in the link by a lengthwise part of the original extrusion with a fixed cross-section, without any additional machining. For instance, in FIG. 3, the cross-sectional profile 10 of the link 4 comprises a circular portion 40 which continues along the longitudinal direction of the original extrusion to define a cylindrical void 11 or attachment portion in the link 4. To the right in FIG. 3, a bolt 14 can be seen engaging this void/attachment portion.

The extrusion is advantageously made in aluminium, providing a light and strong structure. The links are produced by cutting the elongate extrusion in pieces, substantially perpendicularly to the longitudinal axis of the extrusion. Since the extrusion has a fixed cross-sectional profile, all links will be identical, provided they are cut with the same length along the extrusion. In production, an automated cutter can be used, feeding and cutting the extrusions without supervision.

Using links cut from extrusions is a very easy and economical way to make the links for the chain: no more working on the link besides the cutting is need. At the same time, the attachment portions are formed "for free" by virtue of the design of the cross-sectional profile and its extension along the length of the link, as described above. Also, the use of a link, cut from part of an extrusion, provides the advantage of allowing an intricate structure of the link without extra cost, which will lead to further benefits as will be apparent below.

The connection member of the chain clamp 1 according to to the invention connects two links of the chain clamp and holds them together in the fashion of a chain. The connection member can be designed in many ways depending upon the design of the links.

For instance, in one embodiment, the links themselves may have a profile with one end resembling a small cylinder along the length of the link and the other end of the link resembling a longitudinal groove, in the shape of a cylinder truncated along its length. Then, the dimensions of the link could be such that the cylinder part of one link would fit inside the groove part of another link by inserting it from above. When connected in this way, the links would be moveable round an axis at least approximately coinciding with an axis of the cylinder. For this kind of connection, the connection member could be a rod-shaped object, such as a screw, with stops in each end that prevents the two links from separating in the longitudinal direction of the links. The connection member could be inserted in the innermost cylinder of the two connected link and could, as stops, have a head in one end and nut in the other end preventing the two links from separating.

Figure 3:
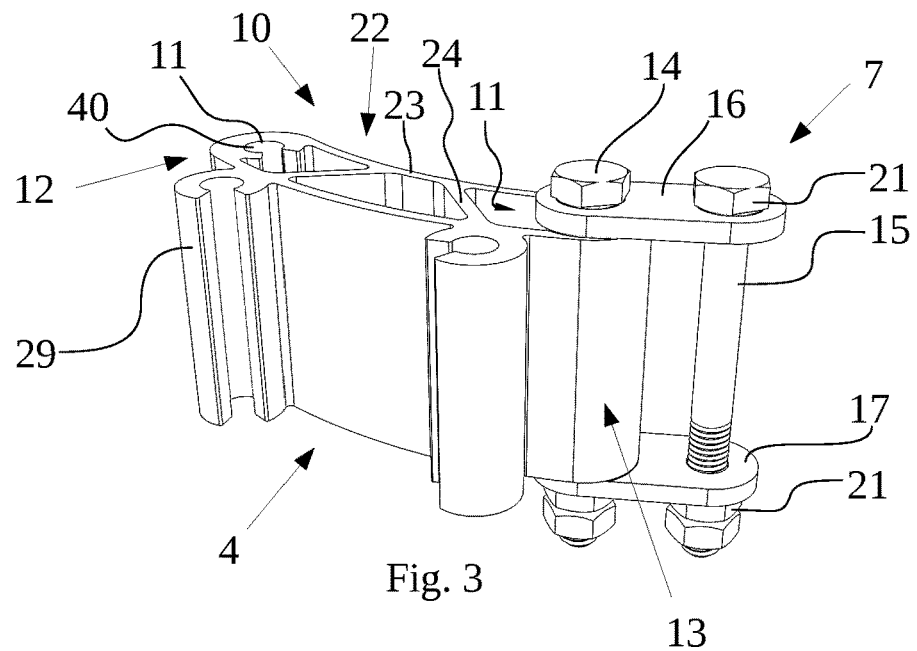
FIG. 3 illustrates a link and a connection member according to the invention.

Another embodiment of the connection member 7 is shown i.a. in FIG. 3. The connection member 7 comprises a first 14 and a second 15 elongated member, such as a bolt shown in FIG. 3. Further, it comprises a first 16 and a second bridging member 17. In the case of FIG. 3, the bridging members are two washers 16, 17 each with two holes through which the bolts are entered. Of course, other variants are possible, such as the elongated members being integral with one bridging member and the other bridging member being a washer as in FIG. 3.

Figure 2:
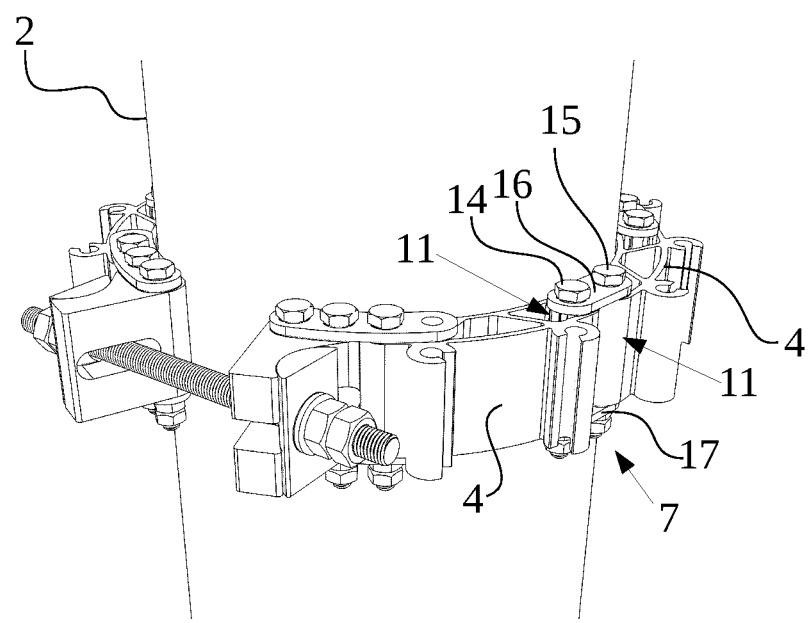
FIG. 2 illustrates a chain clamp according to the invention attached to a supporting structure.

The implementation of the connection member 7 embodiment of FIG. 3 can be studied in FIG. 2. The first elongated member 14 engages an attachment portion 11 of a link 4 and the second elongated member 15 engages an attachment portion 11 of a second link 4. Further, the first bridging member 16 connects to one end portion of each of the elongated members 14, 15 and the second bridging member 17 connects to another end portion of each of the elongated members 14, 15 with the links (4, 4) between the bridging members (16, 17), such that the bridging members 16, 17 provides a mechanical connection between the elongated members 14, 15 keeping the links 5, 6, that are engaged by each elongated member 14, 15, together in a chain fashion.

Depending upon the realisation of this connection member 7 embodiment, fixed stops 21 at each end of the elongated members 14, 15, preventing the elongated members 14, 15 from sliding out of any bridging member 16, 17 may be necessary (FIG. 3). As shown in FIG. 3, bolt heads and nuts are acting as fixed stops. However, alternatives without fixed stops are also conceivable. For instance, if the bridging members comprises threaded holes and the elongate members comprises threaded ends they could engage with each other directly without the need for any nuts/heads.

The cut extrusion link of the chain clamp according to the invention allows for links 4 to have a hollow structure 22 with an outer skin 23 and an inner reinforcement structure 24, as seen in FIG. 3. The skin 23 and reinforcement structure 24 are defined by the cross-sectional profile 10 and its its continuation along the longitudinal direction of the original extrusion. In this way, the link can be mechanically strong and at the same time material consumption, weight and cost are minimised. This structure comes "for free" as described earlier in regard of the attachment portions: no extra machining is necessary besides the cutting of the link from an extrusion.

As can be seen in FIG. 1, the link 4 of the chain clamp according to the invention can have a concave inner periphery 25 such that two portions 26 of the the inner surface 27 of the link are adapted to rest against the surface 28 of the elongated object 2 to be clamped (e.g. FIG. 4) and the remaining inner surface of the link being clear of the surface of the elongated object 2 when in a clamped state. This is due to the inner periphery of the link having a radius that is smaller than the radius of a structure intended to be clamped. In this way, the connection pressure between the link and a clamped object can be substantially higher compared to the contact pressure of a link with a larger contact surface area. This improves the grip of the link (and the chain clamp) with a clamped object.

Figure 4:
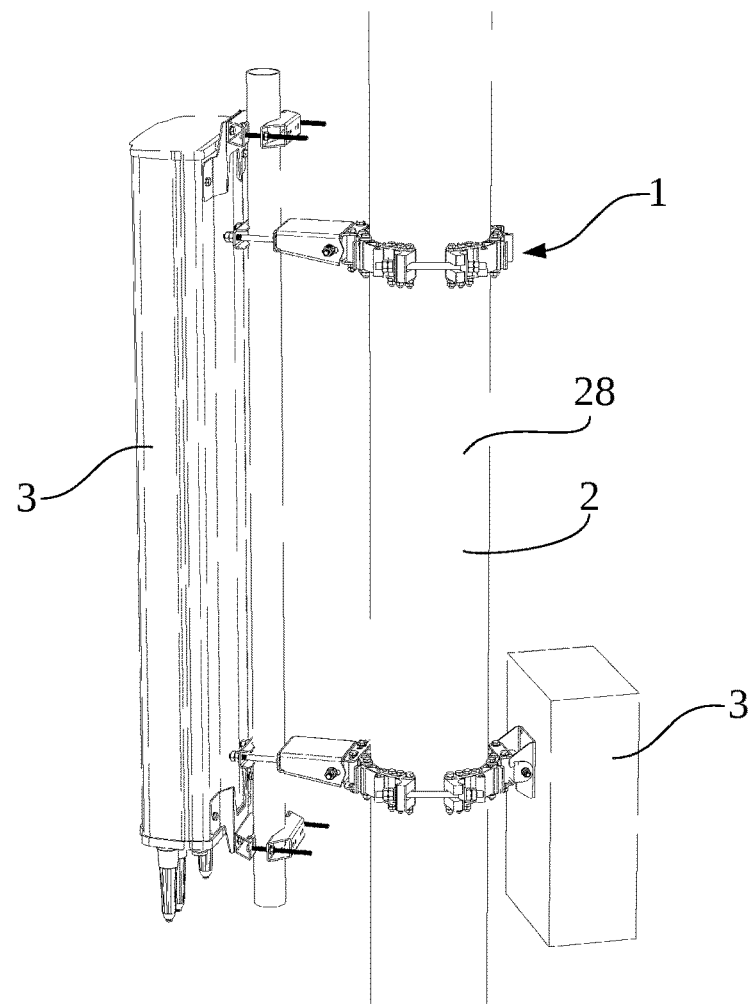
FIG. 4 illustrates two chain clamps according to the invention supporting a radio antenna and a further object.

To allow fastening of an external object, a link 4 of the chain clamp 1 according to the invention may comprise an attachment point 29 integral with the link 4, see FIG. 3. The attachment point 29 is defined by the cross-sectional profile and its its continuation along the longitudinal direction of the original extrusion in same manner as the attachment portions 11 and the reinforcement structure 24 described earlier. A separate object 3 can then be mechanically fastened to the attachment point 29, as seen in FIG. 4.

In view of the tensioner—serving to tighten the clamp to an object—many variants are possible. For instance, a tensioner 8 of the chain clamp according to the invention is shown, as an example, in FIG. 5. It comprises a first 30 and a second 31 tensioner member, each tensioner member 30, 31 having a protruding lever portion 32. The first tensioner member 30 is connected to the first link 5 and the second tensioner member 31 is connected to the second link 6, which links 5, 6 are to be forced towards each other (links can be seen in FIG. 1).

Figure 5:
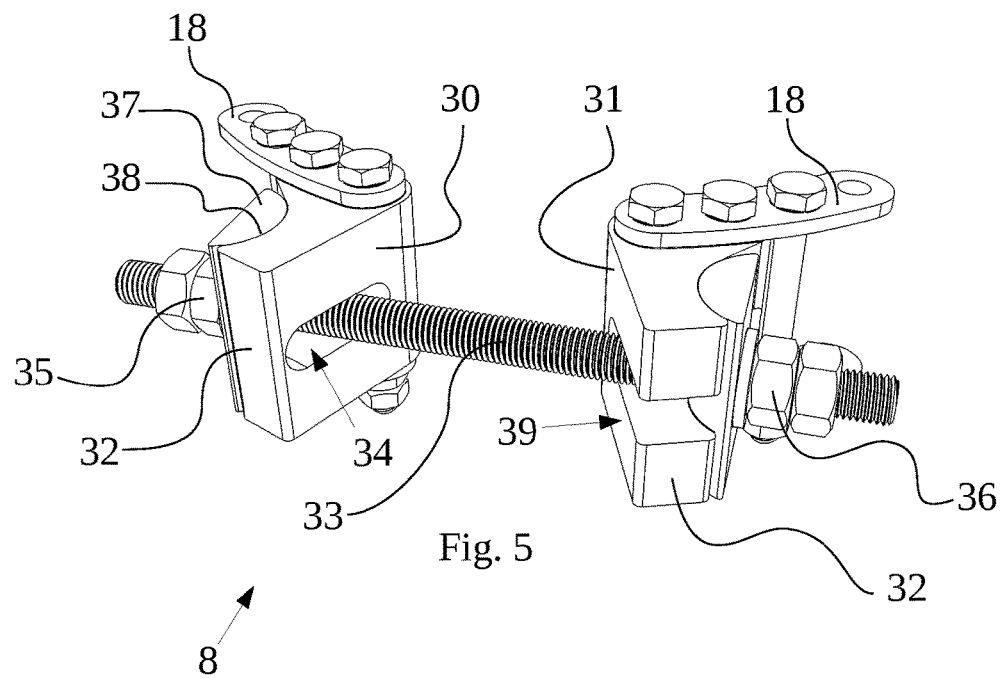
FIG. 5 illustrates a tensioner according to the invention.

Further, this tensioner 8 comprises a threaded bar 33 that can protrude through a hole 34 in the protruding lever portion 32 of both tensioner members 30, 31, such that the tensioner members 30, 31 can be brought together by tightening a nut 35 on the threaded bar 33 abutting the first tensioner member 30, while a fixed object 36 on the threaded bar 33 abuts against the second tensioner member 31. In the case of FIG. 5, the fixed object 36 is a nut. As such, the nut may be moveable along the threaded bar by turning it. However, when tightening the other nut, this nut will be fixed in the sense that it will not move along the bar. Other variants of the fixed member are possible, it could for instance be the head of a screw.

A problem that can occur with the previously described tensioner is that while tensioning the nut(s), the threaded bar 33 can experience a bending force due to the forces pulling on the threaded bar from each side. A threaded bar that is damaged by bending can be a drawback, since it makes it difficult to insert and withdraw from the tensioner members 30, 31. A bent threaded bar may also make it more difficult to turn the nuts on the bar, since the threads are not straight any more. Potentially, the nuts can be damaged by being forced over the damaged/bent threads of the threaded bar.

A solution to this problem can be studied in FIG. 5. At least one tensioner member 30; 31 of the chain clamp 1 according to the invention comprises a sliding insert 37, such that the nut 35 or the fixed object 36 abuts the sliding insert 37 and the sliding insert 37 abuts against a recess 38 in the tensioner member 30; 31. Further, the sliding insert 37 is adapted to slide against the recess 38, during a tensioning of the chain clamp 1, in order to prevent bending of the threaded bar 33 when forcing the links 4, 5 towards each other. In this way, the bar will always be straight, independent of the amount of force on the bar or in which state of a mounting of the chain clamp the bar is in since the sliding insert 37 will slide in reaction to any turning movement of the protruding lever portion.

Another problem that may arise when fastening the chain clamp is that, for a certain circumference of an object to be clamped, there may not be a suitable number of links on the chain clamp to make it fit. For instance, five links may be to few and six links may be to many. The prior art link style band mentioned earlier addresses this with a separate link type that can be adjusted to the desired breadth. However, a separate link type adds to inventory and involves an extra cost for the design and production of the extra link type. Instead, in one embodiment of the chain clamp 1 according to the invention, the tensioner members 30, 31 are connected to each respective link 5, 6 via washers 18 having at least three through holes, see FIG. 5. In this figure, the washers 18 have four holes. The idea is that the tensioner members can be attached to the adjacent links using a different set of holes in the washers. If a bit more length in the chain clamp is needed this can be added by using, for instance, the outermost holes in the washers 18 to connect to the tensioner members 30, 31 and links respectively.

Figure 6:
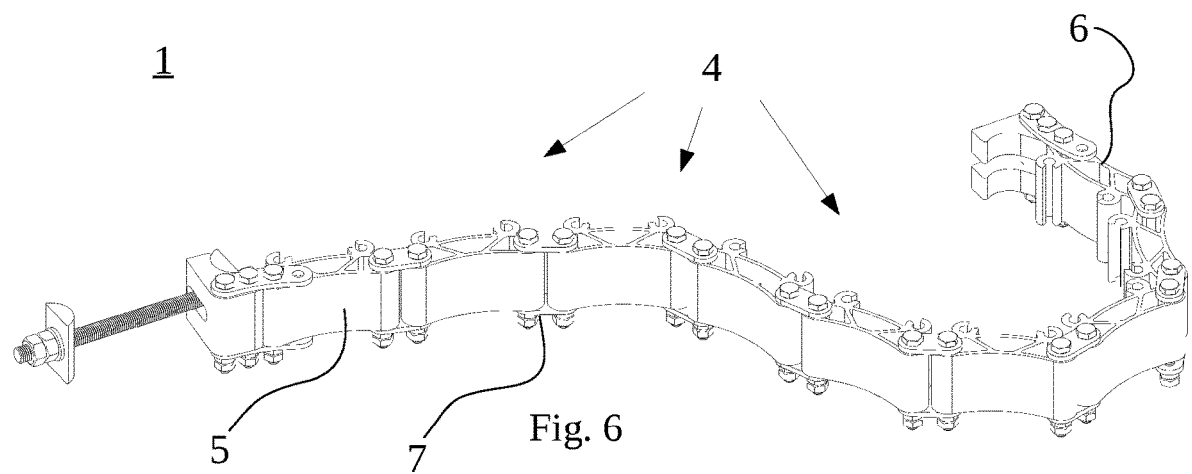
FIG. 6 illustrates an open chain clamp according to the invention.

In order to facilitate a rapid and simple fastening of the chain clamp to an object (the chain clamp having a tensioner with two tensioner members, as described above) it may comprise the following structure, see FIG. 5. A through hole 34 of one tensioner member 31 is truncated such that it has an open side 39 through which the threaded bar 33 can be introduced without removing any nut 35 or fixed object 36 from the threaded bar 33. As can be seen, the threaded bar 33 is kept connected to one of the tensioner members 30, while the other end of the threaded bar can easily be inserted into the other tensioner member 31, through the open side 39, at the time of mounting. In case of a sliding insert 37 embodiment of the tensioner, also the sliding insert can be left on the threaded bar when introducing the bar 33 through the open side 39 of the truncated hole. A chain clamp in this open state can be studied in FIG. 6.

Figure 7:
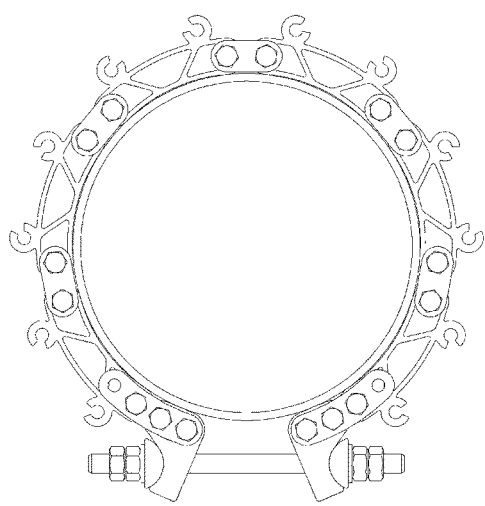
FIG. 7 illustrates a configuration of a chain clamp according to the invention.
Figure 8:
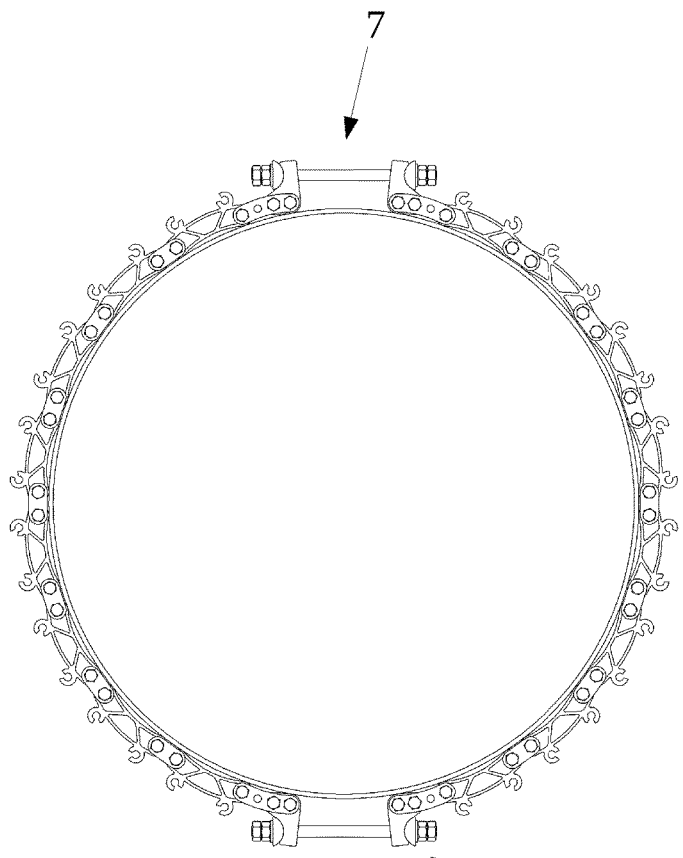
FIG. 8 illustrates another configuration of a chain clamp according to the invention.
Figure 9:
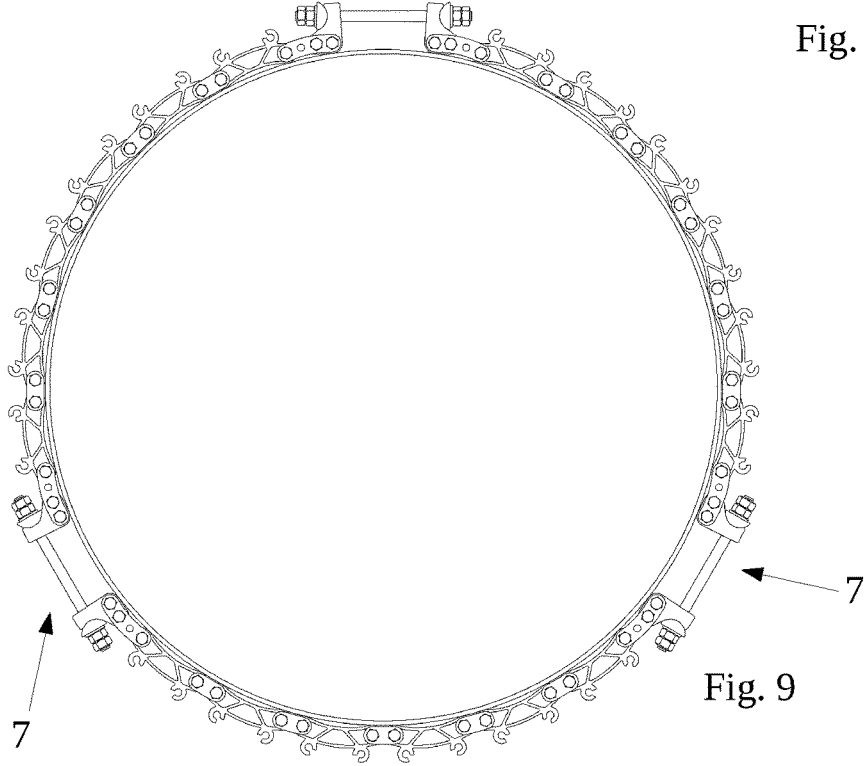
FIG. 9 illustrates yet another configuration of a chain clamp according to the invention.

FIGS. 7, 8 and 9 discloses some other embodiments of the chain clamp 1 according to the invention. As can be seen, in FIGS. 8 and 9, there are multiple tensioners 7 in the chain clamp 1. This facilitates the fastening of the clamp on an elongated object that does not have a round cross section. For instance on square masts or poles.

The invention further comprises a method for producing a chain clamp 1. As mentioned earlier, the chain clamp is intended for clamping around an elongated object 2, such as a mast or pole, and for serving as a support for separate objects 3, such as telecommunications equipment.

The method comprises:

acquiring a plurality of links 4, the plurality of links comprising at least a first link 5 and a second link 6, each link 4 having two attachment portions 11, one at one end 12 of the link 4 and another at an opposite end 13 of the link 4, acquiring at least one connection member 7, connecting two different links 4 at their respective attachment portion 11 and keeping them together in a chain fashion, acquiring a tensioner 8, adapted to connect to the first 5 and second link 6 and to force the links 5, 6 towards each other to tension the chain clamp 1 and clamp it around the elongated object 2, connecting the links 4 with the at least one connection member 7 and the tensioner 8 in order to complete the chain clamp 1.

The method further comprises:

acquiring at least one link 4 that is a piece cut from an elongated extrusion and has a fixed cross-sectional profile 10 and a longitudinal direction, wherein each of the two attachment portions 11 of the at least one link 4 are defined by a respective portion of the cross sectional profile and its continuation along the longitudinal direction of the at least one link 4. As mentioned earlier in connection with the chain clamp embodiments above, the longitudinal direction of the at least one link is understood to be the direction perpendicular to the cross sectional profile and along which the cross sectional profile stays fixed.

The method of the invention also comprises further embodiments with steps to correspond to any of the embodiments of the chain clamp according to the invention described above. In general, the features of any embodiment of the method according to the invention correspond to the features of the chain clamp according to the invention described above.

The invention further comprises a chain clamp 1 as obtainable by the method of the invention described above.

Reference Signs List

1. Chain clamp
2. Elongated object, to be clamped to
3. Separate object (e.g. telecommunications equipment
4. Link
5. First link
6. Second link
7. Connection member, connecting links
8. Tensioner, bringing two links together with force
10. Cross-sectional profile
11. Attachment portion in link, to engage with connection member/tensioner
12. An end of a link
13. Other end of a link
14. First elongated member of connection member
15. Second elongated member of connection member
16. First bridging member of connection member
17. Second bridging member of connection member
18. Washer
21. Fixed stop of elongated member
22. Hollow structure of link
23. Outer skin of link
24. Inner reinforcement structure of link
25. Concave inner periphery of link
26. Portion of inner surface of link
27. Inner surface of link
28. Surface of elongated object (2)
29. Attachment point of link
30. First tensioner member
31. Second tensioner member
32. Protruding lever portion of tensioner member
33. Threaded bar
34. Hole in protruding lever portion (32)
35. Nut on threaded bar
36. Fixed object on threaded bar 37. Sliding insert
38. Recess in tensioner member
39. Open side of hole (34) in lever portion (32)
40. Circular portion of cross-sectional profile (10)

The invention claimed is:

1. Chain clamp for clamping around an elongated object, and for serving as a support for separate objects, wherein the chain clamp comprises:
   a plurality of links, the plurality of links comprising at least a first link and a second link, each of the first and second links having two attachment portions, one of the two attachment portions at one end of each respective link of the first and second links and another of the two attachment portions at an opposite end of the respective link of the first and second links,
   at least one connection member, connecting two links from among the plurality of links at respective attachment portions,
   a tensioner, adapted to connect to the first and second links and to force the first and second links towards each other to tension the chain clamp, characterised in that at least one of the plurality of links is a piece cut from an elongated extrusion and has a fixed cross-sectional profile and a longitudinal direction, wherein each of the two attachment portions of the at least one of the plurality of links are defined by a respective portion of the fixed cross-sectional profile of the at least one of the plurality of links.

2. Chain clamp according to claim 1, wherein the connection member comprises:
   a first and a second elongated member,
   a first and a second bridging member,
   wherein the first elongated member engages the attachment portion of one of the first and second links and the second elongated member engages the attachment portion of the other of the first and second links, wherein the first bridging member connects to one end portion of each of the elongated members and the second bridging member connects to another end portion of each of the elongated members with the first and second links between the bridging members, such that the bridging members provides a mechanical connection between the elongated members keeping the first and second links, that are engaged by each elongated member, together in a chain fashion.

3. Chain clamp according to claim 1, wherein at least one of the plurality of links has a hollow structure with an outer skin and an inner reinforcement structure, the skin and reinforcement structure defined by the cross-sectional profile.

4. Chain clamp according to claim 1, wherein at least one of the plurality of links has a concave inner periphery such that two portions of an inner surface of the at least one of the plurality of links are adapted to rest against a surface of the elongated object to be clamped and the remaining inner surface of the at least one of the plurality of links being clear of the surface of the elongated object when in a clamped state.

5. Chain clamp according to claim 1, wherein at least one of the plurality of links comprises at least one attachment point, integral with the link, and which attachment point is defined by the cross-sectional profile, wherein a separate object can be mechanically fastened to the attachment point.

6. Chain clamp according to claim 1, wherein the tensioner comprises:
   a first and a second tensioner member, each tensioner member having a protruding lever portion, and wherein the first tensioner member is connected to the first link and the second tensioner member is connected to the second link, the first and second links are to be forced towards each other,
   a threaded bar that can protrude through a hole in the protruding lever portion of both tensioner members, such that the tensioner members can be brought together by tightening a nut on the threaded bar abutting the first tensioner member, while a fixed object on the threaded bar abuts against the second tensioner member.

7. Chain clamp according to claim 6, wherein at least one tensioner member further comprises a sliding insert, such that the nut or the fixed object abuts the sliding insert and the sliding insert abuts against a recess in the tensioner member, such that, during a tensioning of the chain clamp, the sliding insert is adapted to slide against the recess in order to prevent bending of the threaded bar when forcing the first and second links towards each other.

8. Chain clamp according to claim 6, wherein the tensioner members are connected to each respective link via washers having at least three through holes.

9. Chain clamp according to claim 6, wherein the hole of one the tensioner members is truncated such that it has an open side through which the threaded bar can be introduced.

10. Chain clamp according to claim 1, wherein there are multiple tensioners in the chain clamp.

11. Method for producing a chain clamp, wherein the chain clamp is for clamping around an elongated object and for serving as a support for separate objects, wherein the method comprises:
   acquiring a plurality of links, the plurality of links comprising at least a first link and a second link, each of the first and second links having two attachment portions, one of the two attachment portions at one end of each respective link of the first and second links and another of the two attachment portions at an opposite end of the respective link of the first and second links,
   acquiring at least one connection member, connecting two links from among the plurality of links at respective attachment portions,
   acquiring a tensioner, adapted to connect to the first and second links and to force the first and second links towards each other to tension the chain clamp,
   connecting two links from among the plurality of links with the at least one connection member and the tensioner in order to complete the chain clamp, characterised by
   acquiring at least one link of the first and second links that is a piece cut from an elongated extrusion and has a fixed cross-sectional profile and a longitudinal direction, wherein each of the two attachment portions of the at least one link of the first and second links are defined by a respective portion of the fixed cross-sectional profile.

12. Chain clamp as obtainable by the method of claim 11.

* * * * *